(12) United States Patent
Gottschall

(10) Patent No.: US 6,825,269 B1
(45) Date of Patent: Nov. 30, 2004

(54) METHOD OF PRODUCING DERIVATIZED POLYMERS

(75) Inventor: Klaus Gottschall, Heddesheim (DE)

(73) Assignee: Dr. Gottschall Instruction Gesellschaft fuer Technische Chromatografie mbH, Ludwigshafen (DE)

( * ) Notice: Subject to any disclaimer, the term of this patent is extended or adjusted under 35 U.S.C. 154(b) by 0 days.

(21) Appl. No.: 09/856,981

(22) PCT Filed: Nov. 29, 1999

(86) PCT No.: PCT/EP99/09200

§ 371 (c)(1),
(2), (4) Date: Oct. 12, 2001

(87) PCT Pub. No.: WO00/32649

PCT Pub. Date: Jun. 8, 2000

(30) Foreign Application Priority Data

Nov. 30, 1998 (DE) .......................... 198 55 173

(51) Int. Cl.⁷ ................................. C08F 8/30
(52) U.S. Cl. .............. 525/61; 525/326.6; 525/328.5; 525/328.8; 525/329.9; 525/375
(58) Field of Search ............... 525/61, 328.5, 525/328.8, 329.9, 326.6, 375

(56) References Cited

U.S. PATENT DOCUMENTS

| | | | |
|---|---|---|---|
| 4,076,916 A | | 2/1978 | Lagow |
| 4,340,686 A | * | 7/1982 | Foss ..................... 525/59 |
| 4,463,139 A | | 7/1984 | Berger |
| 4,642,353 A | | 2/1987 | Berger |
| 4,843,122 A | * | 6/1989 | Stavrianopoulos ........... 525/61 |
| 5,008,339 A | | 4/1991 | Anson et al. |
| 5,453,461 A | | 9/1995 | Heiliger et al. |
| 5,582,955 A | | 12/1996 | Keana et al. |
| 5,795,719 A | | 8/1998 | Richard et al. |

FOREIGN PATENT DOCUMENTS

| | | |
|---|---|---|
| CH | 606196 | 10/1978 |
| DE | 281397 A5 | 7/1987 |
| DE | 253027 A1 | 1/1988 |
| DE | 4341524 | 1/1997 |
| EP | 0134041 B1 | 4/1988 |
| EP | 0591807 | 4/1994 |
| EP | 0184361 | 1/1996 |
| EP | 0698620 A1 | 2/1996 |
| EP | 0700933 | 3/1996 |
| FR | 2382489 | 9/1978 |
| FR | 2526028 | 11/1983 |
| WO | PCT/WO/93/09075 | 5/1993 |

OTHER PUBLICATIONS

CAPius 1994:574526 printout for: Improved Method for Preparing N–Hydroxysuccinimide Ester–Containing Polymers for Affinity Chromatography, by M Wilchek, K. L. Knudsen and T. Miron, Bioconjugate Chem. (1994), 5(5), 491–492.

Supramolekulare Strukturen bei Polymeren Ein Weg zu Intelligenten Materialien, by M. Antonietti and S. Heinz, Nachr. Chem. Tech. Lab. 40 (1992) Nr. 3, pp. 308–314, along with a one–page English language summary.

Poly (vinyl alcholol) functionalized by monosuccinate groups. Coupling if bioactive amino compounds, Polymer, vol. 39, No. 13, 1998, pp. 2751–2757.

Combinatorial Catalysis of an Elimination Reaction, J. Org. Chem., 1998, 63, pp. 7578–7579.

Immunosorption Techniques, Fundamentals and Applications, Akademie Verlag Berlin (1992) pp. 34–40.

Römpp Chemielexikon by Herman Römpp, published by Thieme Verlag, pp. 3321–3322 (1999), along with a one–page English translation of a relevant portion.

* cited by examiner

Primary Examiner—Bernard Lipman
(74) Attorney, Agent, or Firm—Jones Day

(57) ABSTRACT

Process for the preparation of a derivative of a polymer having at least one functional group, characterized in that the process comprises the following step (i):

(i) reaction of the polymer having at least one functional group, with at least one activating reagent or at least one derivative of an activating reagent in homogeneous phase.

13 Claims, No Drawings

METHOD OF PRODUCING DERIVATIZED POLYMERS

BACKGROUND OF THE INVENTION

1. Field of the Invention

The present invention relates to a process for the preparation of derivatives of polymers having functional groups by means of activating reagents, the use of such activating reagents for the preparation of the derivatized polymers, and the use of these polymers as receptors for substrate binding.

2. Related Art

Polymers which are derivatized with defined radicals are suitable for very different types of chemical applications and industrial applications. Accordingly, there is a great need, especially, for those polymers which are derivatized with radicals which are made-to-measure for appropriate areas of use.

A process which can be employed broadly and in variable form is therefore of great value for the reaction of polymers carrying functional groups with reagents which are already suitably configured and which have already been designed in a goal-oriented manner before the reaction with respect to the later area of use. With such a rational polymer design, it is then possible to prepare, i.e. make to measure, polymers having the necessary and desirable properties, in a simple manner.

Those derivatized polymers are of particular importance in which specific interactions can be achieved between the radicals and substrates introduced via the derivatization, which are brought into contact with the polymer derivatives. By means of the route of rational polymer design, selective, indeed even specific interactions, which can already be planned before the polymer derivatization, between the receptor group, i.e., for example, between the radical(s) introduced into the polymer via the derivatization or some of this (these) radical (radicals), and the substrates can be achieved.

In order to equip polymers having functional groups with such receptor groups, as a rule until now only three routes have been proposed, which are listed in M. Antonietti, S. Heinz, Nachr. Chem. Tech. Lab. 40 (1992) No. 3, pp. 308–314. According to this publication, such derivatized polymers are obtainable via random polymerization or copolymerization, via the preparation of block copolymers and via the preparation of surface-functionalized polymer particles. These preparation routes start from derivatized monomers from which the polymer is obtained. For many application areas, i.e., for example, for many desired polymer derivative-substrate interactions, these derivatized monomers, however, cannot be prepared or can only be prepared with an industrially and economically unacceptable outlay.

A further possibility for derivatizing polymers is polymer-analogous reaction of polymers having functional groups, with derivatizing compounds. In these cases, however, it has until now not been possible or only been possible with extremely great difficulty to introduce, by reaction of, for example, polar polymers having functional groups, radicals of interest for the application into the polymer in such a way that soluble derivatives are formed which can be processed further in a correspondingly simple manner in possibly subsequent processes.

Because of the different kind of objective, polymer derivatizations have been carried out until now, for example, on solid surfaces, i.e. the reactions were carried out heterogeneously. This group includes, inter alia, carrier activation and carrier immobilization, in which a nucleophilic substance is customarily bonded heterogeneously to a polymer, for example epoxy polyacrylic ester or BrCN-sepharose (for this see P. Mohr, M. Holtzhauer, G. Kaiser, Immunosorption Techniques, Fundamentals and Applications, Akademie Verlag, Berlin (1992), pp. 34–40).

SUMMARY OF THE INVENTION

The preferred embodiments of the present invention provide a process for the preparation of a derivative of a polymer having at least one functional group, wherein the process comprises the following step (i):

(i) reacting a polymer having at least one functional group, with at least one activating reagent or a derivative of an activating reagent in a homogeneous phase.

The preferred embodiments of the present invention also provide a derivative of a polymer having at least one functional group, preparable by a process which comprises the following step (i):

(i) reacting the polymer having at least one functional group, with at least one activating reagent or a derivative of an activating reagent in a homogeneous phase.

The preferred embodiments of the present invention also provide derivative of a polymer having at least one functional group, preparable by a process which comprises the following step (i):

(i) reacting the polymer having at least one functional group, with at least one activating reagent or a derivative of an activating reagent in a homogeneous phase.

DETAILED DESCRIPTION

A process which makes it possible to derivatize polymers having functional groups in a simple manner in a homogeneous phase is provided.

In the context of the process according to a preferred aspect of the invention, it is possible to react the polymer having at least one functional group firstly with an activating reagent in homogeneous phase.

Likewise, it is of course also possible in the process according to a preferred aspect of the invention to react the polymer having at least one functional group with a mixture of two or more suitable activating reagents. These can be reacted simultaneously with the polymer. Likewise, the two or more activating reagents can also be reacted successively with the polymer.

If the polymer is reacted on at least two functional groups with different activating reagents in each case, as described above, it is possible, depending on the choice of the activating reagents, for the activated groups to have identical or alternatively different reactivity.

The reaction preferably takes place here in liquid phase. It may therefore be necessary to dissolve the polymer to be reacted in a suitable solvent or solvent mixture before the reaction. In the case in which the polymer having at least one functional group is liquid, it is possible, if this is necessary, likewise to add a solvent or a solvent mixture.

Preferably, the solvent or solvent mixture is selected such that the activating reagent, should this be present per se in solid form, can likewise be dissolved therein. The activating reagent here, should this be present per se in solid form, is dissolved in a suitable solvent or solvent mixture and then reacted with the polymer having at least one functional group, which is optionally likewise present in a suitable solvent or solvent mixture. However, it is also possible to add the activating reagent, should this be present per se in solid form, directly to the polymer which is optionally present in a suitable solvent or solvent mixture.

In the context of the process according to a preferred aspect of the invention, it is also possible to start from a prederivatized polymer to improve the solubility of the polymer. Here, the degree of derivatization of the prederivatized polymer and/or the nature of the derivatizing groups which the prederivatized polymer contains is/are expediently set according to the solvent or solvent mixture used, in which the prederivatized polymer is meant to be soluble.

As a rule, the activating reagent here is selected such that the at least one functional group of the polymer reacts during the reaction with the activating reagent and is thus improved in its reactivity in a subsequent reaction with a derivatizing reagent.

Accordingly, a preferred aspect of the present invention also relates to a process, as defined above, further comprising step (ii):
(ii) reaction of the reaction product from the polymer having at least one functional group and the activating reagent, with a derivatizing reagent.

In the context of this embodiment of the process according to a preferred aspect of the invention, the polymer having at least one functional group can be reacted simultaneously, i.e. in the sense of a "one-pot reaction" with at least one activated and/or at least one non-activated derivatizing reagent and/or an activating reagent.

By means of this reaction of the activated polymer having at least one functional group, a desired radical can be introduced into the polymer using a derivatizing reagent.

If, as described above, a polymer is reacted with different activating reagents, these activated functional groups can have differing reactivity to one or more derivatizing reagents. Accordingly, it is possible in the context of the process according to a preferred aspect of the invention to derivatize functional groups selectively in this manner. The term "selective" in this connection means that a polymer which has, for example, two or more functional groups which are different from one another is reacted with, for example, two different activating reagents so that a subsequent reaction with a derivatizing reagent for derivatization takes place mainly to exclusively on the activated functional group(s) which is or are activated with one of these two activating reagents, as a rule on the functional group(s) which is/are more reactively activated with respect to the derivatizing reagent.

In this case, two or more functional groups which are different from one another can be reacted with activating reagents which are different from or identical to one another, or else two or more identical functional groups can be reacted with activating reagents which are different from one another.

Here, as a rule, it is the case that in the reaction of the functional group activated using the activating reagent, with the derivatizing reagent, some of the activating reagent which remains in the now activated polymer after the reaction with the functional group of the polymer, functions as a leaving group in the reaction with the derivatizing reagent.

Depending on the chemical nature of the activating reagent and/or of the derivatizing reagent, it is of course also possible that in the reaction of the activated polymer with the derivatizing reagent some, or alternatively the entirety, of the structure of the activating reagent which is present in the activated polymer remains in the derivatized polymer.

In the process according to a preferred aspect of the invention, it is furthermore possible to react the activating reagent with the derivatizing reagent before the reaction with the polymer having at least one functional group in order then to react this reaction product with the polymer having at least one functional group.

A preferred aspect of the present invention therefore also relates to a process, as described above, where the derivative of the activating reagent is obtained by prior reaction of the activating reagent with a derivatizing reagent.

Here, it is possible in principle that in the reaction of the product from the reaction of activating reagent with derivatizing reagent some of the activating reagent which is present in this product functions as a leaving group in the reaction with the polymer.

It is likewise possible in the context of the process according to a preferred aspect of the invention with appropriate choice of the activating reagent and/or of the derivatizing reagent that in the reaction of the product from the reaction of activating reagent and derivatizing reagent with the polymer having at least one functional group some, or the entirety, of the structure of the activating reagent present in the reaction product of activating reagent and derivatizing reagent remains in the polymer.

A further, possible embodiment of a preferred aspect of the present invention consists in reacting the polymer having at least one functional group, with different products from reactions of activating reagents and derivatizing reagents. Thus, for example, a mixture of compounds can be reacted with the polymer, the mixture comprising reaction products of an activating reagent and two or more different derivatizing reagents. A mixture is likewise possible which comprises reaction products of a derivatizing reagent and two or more different activating reagents. Of course, it is also possible, should this be necessary, to employ a mixture which comprises reaction products of two or more different activating reagents and two or more different derivatizing reagents. Obviously, it is also possible in the context of a preferred aspect of the present invention to react the different reaction products of activating reagent and derivatizing reagent not as a mixture, but individually and in the desired sequence, with the polymer having at least one functional group.

Accordingly, a preferred aspect of the present invention also describes a process as described above, where the polymer having at least one functional group is reacted with at least two different derivatives of an activating reagent and the reactions are carried out successively with one derivative in each case.

It is possible here that the derivatized polymer prepared as described above is present in liquid, homogeneous phase as a solid after the reaction of the polymer having at least one functional group. In order possibly to carry out further reactions, likewise in homogeneous, liquid phase, it is possible after the reaction of the polymer having at least one functional group to exchange the solvent or the solvent mixture such that the derivatized polymer is present again as a dissolved substance.

Activating reagents which can be employed in principle are all activating reagents known from the literature. A general survey of a whole series of activating reagents which can be employed for the activation of different functional groups is given, for example, by the article of P. Mohr, M. Holtzhauer, G. Kaiser already cited above, which in this respect is included completely in the context of the present patent application by way of reference.

In particular, chloroformic acid esters and chloroformic acid esters having electron-withdrawing radicals may be mentioned.

In particular, a preferred aspect of the present invention relates to a process, as described above, characterized in that the activating reagent is derived from a compound of the following structure (I):

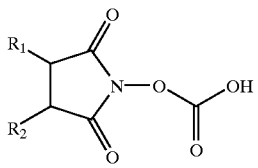

(I)

where $R_1$ and $R_2$ are identical or different and can be straight-chain, branched-chain or bridged to give a carbocycle or a heterocycle and are selected such that the activating reagent or the derivative of the activating reagent can be reacted in homogeneous phase with the polymer having at least one functional group.

Here, $R_1$ and $R_2$ can be, for example, cycloalkyl, cycloalkenyl, alkyl, aryl or aralkyl radicals having up to 30 C atoms.

In a preferred embodiment, a preferred aspect of the present invention describes a process, as described above, which is characterized in that the activating reagent is derived from a compound of the following structure (I')

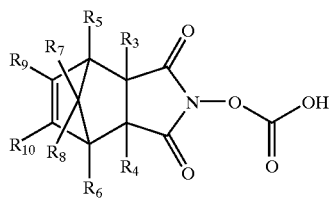

(I')

where $R_3$ to $R_{10}$ can be identical or different and can be hydrogen, straight-chain or branched-chain alkyl, aryl, cycloalkyl, heterocyclic and aralkyl radicals having up to 30 C atoms, or else a number of $R_3$ to $R_{10}$ radicals can in turn be bridged to give a carbocycle or heterocycle and are selected such that the activating reagent or the derivative of the activating reagent can be reacted in homogeneous phase, with the polymer having at least one functional group.

A preferred aspect of the present invention further describes a process, as described above, characterized in that the activating reagent has the following structure (II)

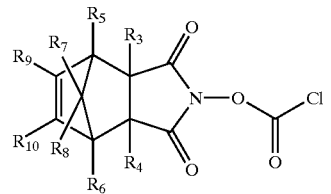

(II)

where $R_3$ to $R_{10}$ are as defined above.

Here, $R_3$ to $R_{10}$, for example, can be suitably selected from the group consisting of alkyl, aryl and aralkyl radicals having up to 30 C atoms.

In a particularly preferred embodiment, a preferred aspect of the present invention describes a process, as described above, which is characterized in that the activating reagent is derived from a compound of the structure (II), as indicated above, where $R_3$ to $R_{10}$ is in each case hydrogen.

A particularly preferred activating reagent employed in the process according to the invention is the compound of the structure (II), in which the radicals $R_3$ to $R_{10}$ are hydrogen, designated below as ONB—Cl.

The compounds having the structures (I), (I') and (II) can be prepared by all customary processes known from the prior art. Such a process for ONB—Cl is indicated, for example, in P. Henklein et al., Z. Chem. 9 (1986), pp. 329 ff.

Using the activating reagents or derivatives of activating reagents as described above, in principle all polymers which contain at least one functional group which is reactive with the activating reagents can be reacted.

Very generally, polymers are employed in the process according to a preferred aspect of the invention which, as at least one functional group, have a group which has at least one nucleophilic unit.

Preferred functional groups of the polymer having at least one functional group which may be mentioned are, inter alia, OH groups, optionally substituted amine groups, SH groups, $OSO_3H$ groups, $SO_3H$ groups, $OPO_3H_2$ groups, $OPO_3HR_{11}$ groups, $PO_3H_2$ groups, $PO_3HR_{11}$ groups, COOH groups and mixtures of two or more thereof, where in each case $R_{11}$ is selected such that the activating reagent or the derivative of the activating reagent can be reacted in homogeneous phase with the polymer having at least one functional group.

A preferred aspect of the present invention therefore also relates to a process, as described above, characterized in that the functional group of the polymer having at least one functional group is an OH group, an $NHR_{11}$ group, an SH group, an $OSO_3H$ group, an $SO_3H$ group, an $OPO_3H_2$ group, an $OPO_3HR_{11}$ group, a $PO_3H_2$ group, a $PO_3HR_{11}$ group, a COOH group or a mixture of two or more thereof.

Likewise, the polymers having at least one functional group can also contain further polar groups, such as —CN.

Both natural and synthetic polymers can be employed as the polymer having at least one functional group. Possible restrictions in the selection of the polymers only result if the reaction of the polymer is performed in homogeneous phase in the context of the process according to the invention and from the later intended use of the derivatized polymer.

Here, in the context of a preferred aspect of the invention the term "polymer" obviously likewise includes higher molecular weight compounds, which are designated in polymer chemistry as "oligomers".

Without wishing to be restricted to certain polymers, possible polymers having at least one functional group which may be mentioned are, inter alia:

polysaccharides, such as cellulose, amylose and dextrans;
oligosaccharides such as cyclodextrins;
chitosan;
polyvinyl alcohol, poly-Thr, poly-Ser;
polyethyleneimine, polyallylamine, polyvinylamine, polyvinylimidazole, polyaniline,
polypyrrole, poly-Lys;
poly(meth)acrylic acid (esters), polyitaconic acid, poly-Asp;
poly-Cys.

Likewise, not only homopolymers, but also copolymers and in particular block copolymers and random copolymers are suitable in principle to be employed in the present process.

Here, both copolymers having non-functionalized components such as, for example, co-styrene or co-ethylene or alternatively copolymers such as, for example, co-pyrrolidone, may be mentioned.

Here, the molar masses of the polymers having at least one functional group used as starting materials are preferably in the range from 10000 to 50000 daltons.

In order to achieve optimum solubility, mixed-functional or alternatively prederivatized polymers are preferably employed. Examples of these which may be mentioned are, for example:

partially or completely alkylated or acylated cellulose;

polyvinyl acetate/polyvinyl alcohol;

polyvinyl ether/polyvinyl alcohol;

N-butylpolyvinylamine/polyvinylamine.

Likewise, polymer/copolymer mixtures can also be used. Here, all suitable polymer/copolymer mixtures can be employed, for example mixtures of the polymers and copolymers already mentioned above, where, inter alia, mention may be made here, for example, of:

poly(acylic acid)/co-vinyl acetate;

polyvinyl alcohol/co-ethylene;

polyoxymethylene/co-ethylene;

modified polystyrenes, such as copolymers of styrene with (meth)acrylic acid (esters);

polyvinylpyrrolidone and its copolymers with poly(meth)acrylates.

In a preferred embodiment, the above mixtures and/or copolymers are constructed such that one component has no functional groups, while the other component has functional groups which can then be activated according to the invention.

If, as described above, the polymer having at least one functional group is reacted with an activating reagent such as a compound of the structure (II), it is possible, as likewise described above, for this reaction product to be reacted with a derivatizing reagent.

Here, in principle all reagents which can react with the activated polymer and lead directly or indirectly to the desired derivatized polymer can be used. Inter alia, compounds are employed in the process according to the invention as derivatizing reagents which have at least one nucleophilic group.

For example, derivatizing reagents are used which have the general composition $HY$—$R_{12}$. Here, Y is, for example, O, NH, $NR_{13}$ or S where $R_{12}$ and $R_{13}$ can generally be freely selected. For example, they are an optionally suitably substituted alkyl or aryl radical.

In addition, it is also possible to react the activated polymer with nucleophilic chiral compounds. Examples of such chiral nucleophiles which may be mentioned are, for example:

borneol, (−)-methanol, (−)-ephedrine, α-phenylethylamine, adrenaline, dopamine.

A further possibility is to react the activated polymer in the process according to the invention with a mono- or polyhydric alcohol or thiol containing an amino group. If the polymer containing at least one functional group is activated, for example, with ONB—Cl, the mono- or polyhydric alcohol containing the amino group or the mono- or polyhydric thiol containing the amino group reacts selectively with the amino group. The OH or SH groups thus introduced into the polymer can then be activated in a further step again with, for example, one of the activating reagents described above, whereby chain extension and branching are made possible, depending on the functionality of the alcohols or thiols originally employed.

In another embodiment of the process according to a preferred aspect of the invention, which has already been described above, the polymer having at least one functional group is reacted with an activated derivatizing reagent, the latter being obtained from the reaction of an activating reagent with the derivatizing reagent.

Preferably, activated derivatives of amines, alcohols, thiols, carboxylic acids, sulphonic acids, sulphates, phosphates or phosphonic acids are reacted in the process according to a preferred aspect of the invention with the polymer having at least one functional group, where, in turn in a preferred embodiment, the compounds are activated using ONB—Cl.

Inter alia, these activated derivatizing reagents, which can be reacted with the polymer having at least one functional group, thus have the following general structures (III) to (IX):

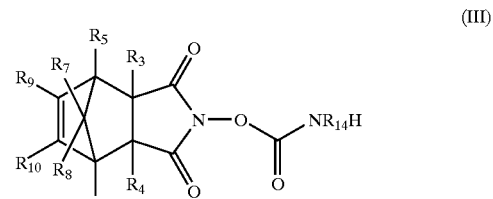

(III)

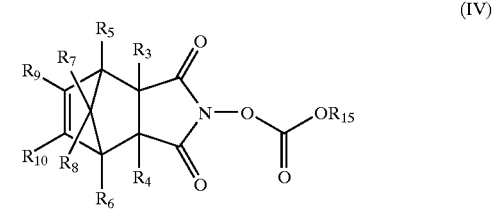

(IV)

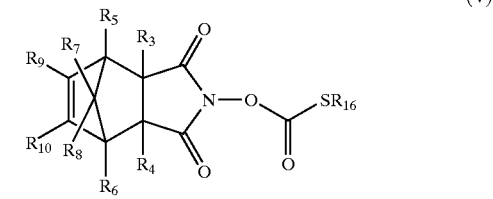

(V)

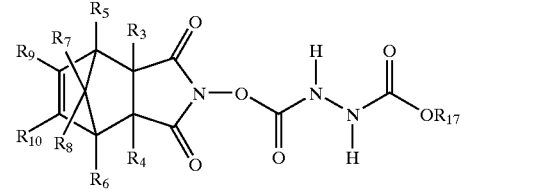

(VI)

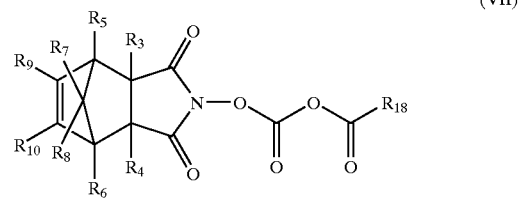

(VII)

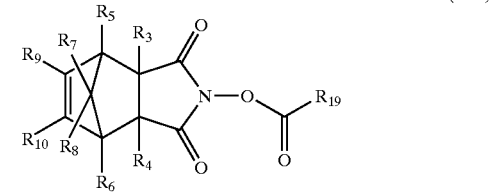

(VIII)

-continued

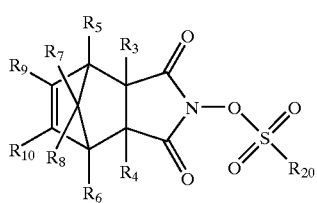
(IX)

where $R_3$ to $R_{10}$ are as defined above and $R_{14}$ to $R_{20}$ are in general subject to no restrictions, for example can also have chirality, and are selected in the process according to the invention such that the reaction with the polymer having at least one functional group can be carried out in homogeneous phase. As a rule, the substituents $R_{14}$ to $R_{20}$ here are selected depending on the desired interaction with the substrate. Here, $R_{14}$ to $R_{20}$ can be identical or different and are hydrogen, a straight-chain or branched-chain alkyl, aryl or aralkyl radical having up to 30 C atoms or radicals having appropriate heteroatoms.

A preferred aspect of the present invention therefore also describes a derivative of an activating reagent according to structure (II), characterized in that it has one of the two structures (II') or (II")

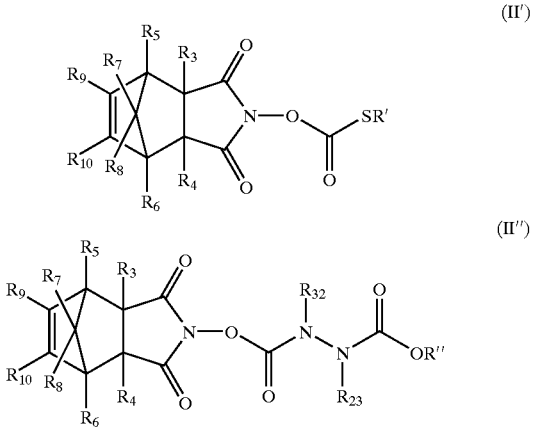

where $R_3$ to $R_{10}$ are as defined above, $R_{22}$ and $R_{23}$ are defined as $R_{14}$ to $R_{20}$ and can be identical to or different from one another, and R' and R" can be identical or different and can be alkyl, aryl or aralkyl radicals and are selected in the process according to the invention such that the reaction with the polymer having at least one functional group can be carried out in homogeneous phase. Further, the above substituents on the structures (II') and (II") are also selected such that the desired interactions with the substrate can be achieved.

Likewise, polyfunctional amines, alcohols, thiols, carboxylic acid, sulphonic acids, sulphates, phosphates or phosphonic acids can be reacted with an activating reagent and this reaction product can be reacted with the polymer having at least one functional group, where here, in particular, polyols may be mentioned.

Obviously, it is also possible to activate derivatizing reagents which have two or more different types of the functional groups mentioned above and to react them with the polymer having at least one functional group. Examples which may be mentioned here are, inter alia, aminoalcohols.

In the context of a preferred aspect of the present invention, such polyfunctional derivatizing reagents can be partially or completely activated selectively with an activating reagent and reacted with the polymer having at least one functional group.

The reaction of the polymer having at least one functional group with an activated, polyfunctional derivatizing reagent can be used in the process according to a preferred aspect of the invention for polymer crosslinking, for polymer stabilization and for polymer branching.

Both the reaction of the polymer having at least one functional group with an activated derivatizing reagent and the reaction of the polymer having at least one functional group with an activating reagent and subsequent reaction of the product with a derivatizing reagent by the process according to a preferred aspect of the invention makes it possible to prepare polymer derivatives which have very different spatial arrangements and accordingly can be used for a large number of applications in which the spatial arrangement is of crucial importance.

Thus, it is possible, for example, to realise arrangements which are constructed as hairy rods, comb polymers, networks, baskets, dishes, tubes, funnels or cages.

The reactions can be carried out here in aprotic-dipolar and/or polar-protic solvents or solvent mixtures such as aqueous solvent mixtures. Depending on the polymer to be reacted and the activating and/or derivatizing reagent used, various further solvents can be present in these solvent mixtures in addition to water. Preferably, solvents employed here are, inter alia, those such as aprotic-dipolar solvents such as DMSO, DMF, dimethylacetamide, N-methylpyrrolidone, THF or MTBE.

The pH which can be chosen in the reactions is in this case in general in the range from 4 to 14 in the process according to a preferred aspect of the invention, preferably in the range from 5 to 12 and particularly preferably in the range from 5 to 10. For the establishment of a certain pH range, it is possible to work with suitable buffer solutions.

By means of the groups introduced into the polymer in the process according to a preferred aspect of the invention via the derivatization, suitable chemical substances, so-called substrates, can be selectively or specifically bound. The groups introduced act here as receptor groups; the derivatized polymer thus very generally also acts as a receptor.

Possible interactions with the substrate which may be mentioned here are, inter alia:
hydrogen bonds;
dipole-dipole interactions;
Van der Waals interactions;
hydrophobic interactions;
charge-transfer interactions, e.g. π-π interaction;
ionic interactions;
coordinative bonding, e.g. to transition metals;
combinations of these interactions.

The interaction or the interactions between the derivatized polymer and the substrate can be formed here in the solid state, in solution, in liquid phase and in the gas phase.

By means of the process according to a preferred aspect of a preferred aspect of the invention, it is possible to "design" the receptor-substrate interaction using made-to-measure receptor groups. This means that when using the derivatized polymer in, for example, membrane processes, catalysis, filtration or chromatography in the presence of two or more substrates, a selectivity of the interaction with respect to one substrate can be achieved.

In the context of a preferred aspect of the present invention, the degree of derivatization which, in the case in which the derivatized polymer is employed as a receptor, corresponds to the receptor group density, can be influenced such that the best possible interaction with the substrate is achieved and an adequate solubility of the polymer derivative is obtained.

Preferably, in the context of the process according to the invention a degree of derivatization in the range from 1 to 70%, particularly preferably in the range from 3 to 60% and especially preferably in the range from 5 to 50%, is chosen.

Accordingly, a preferred aspect of the present invention relates to a derivative of a polymer having at least three functional groups, where at least two of the functional groups are derivatized in such a way that they interact with a suitable substrate as receptor groups and at least one functional group having non-substrate-specific action lies between two of these derivatized groups.

If a number of functional groups which do not act as receptor groups for the substrate are present in the polymer, they can be of an identical or different type.

If, for example, a polymer which only has one type of functional group is used as a starting material, functional groups which do not act as receptor groups are naturally only of one type. However, it is also possible, for example, that a polymer which has two or more different types of functional groups is used as a starting material. In this case too, it is possible that the groups which do not act as receptor groups are of one type. This would be the case, for example, if, except for the type of functional group in question, all other types of functional groups were derivatized via specific derivatization, as described above. In this case, however, it is also possible that a proportion of the type of functional group in question would likewise be derivatized.

Obviously, it is also possible that the functional groups which do not act as receptor groups are of different types. It is possible, for example, to start from a polymer which has at least three different types of functional groups, of which at least two were not reacted in a specific derivatization as described above. However, the case is also possible in which a polymer is used as a starting material which has two or more different types of functional groups, of which only a certain proportion in each case was derivatized, so that a certain proportion of each type of functional groups remains underivatized.

With respect to the derivative according to the invention, of a polymer having at least one functional group, as described above, it is possible that one or more functional groups which are present in underivatized form have a substrate-specific or non-substrate-specific action as a receptor group. This can be due to the fact, for example, that on account of the space requirement of the receptor groups their interaction with the substrate itself is sterically impossible.

However, it is also possible that the at least one functional group which is present in the starting polymer makes a contribution to the interaction with the substrate in underivatized form.

A derivative of a polymer having functional groups in which the at least one functional group having non-substrate-specific action is derivatized with an end-capping group is preferred.

Accordingly, a preferred aspect of the present invention also describes a derivative of a polymer having at least three functional groups, where at least one functional group not having a substrate specific action is derivatized with an end-capping group.

By skilled choice of the end-capping group, it is also possible to influence the solubility of the polymer derivative provided with the end-capping group or with the end-capping groups and to adapt it to the requirements in the case of possible later, further reactions.

As an end-capping group, in principle any group can be selected which makes a functional group inert or to the greatest possible extent inert to interactions with the substrate. The term "inert" in this connection means that the interactions which the substrate undergoes with the receptor groups of the derivatized polymer, in comparison with the interactions which this substrate undergoes with one or more of the functional groups derivatized by the end-capping group, are so strong that the substrate is essentially only bound via the receptor groups.

If it is desired to separate two or more different substrates, for example in a chromatographic process, by means of the interaction between substrate and receptor group, the end-capping group must not make the functional group completely inert to possible interactions, such as described above. In this case, it suffices, for example, if the end-capping group undergoes sufficiently weak or non-specific interactions, which play no part in the separating process, with the two or more substrates to be separated.

As an end-capping group, any suitable group according to the prior art can be used here. Depending on the substrate, it is possible, for example, that the end-capping group chosen is a group which is not an H donor. Preferably,

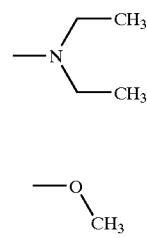

A preferred aspect of the present invention further describes a derivative of the type in question here, which has at least one receptor group which has a binding unit which is decisive for the binding of a biological substrate.

A derivative of this type made-to-measure for biological substrates then has corresponding receptor groups which can have, for example, structures also occurring in nature or parts of structures of this type, responsible for the binding, which can then interact with a biological substrate. In this case, in particular, enzyme, amino acid, peptide, sugar, amino sugar, sugar acid and oligosaccharide groups or derivatives thereof may be mentioned. Essential for the above receptor groups is exclusively the fact that the binding principle, occurring in nature, of a receptor with a substrate is retained, so that by means of this embodiment, for example, synthetic enzymes, binding domains of antibodies or other physiological epitopes can be obtained.

The receptor group introduced into the derivative according to the invention, of a polymer having at least three functional groups can be any radical described as above in the process according to the invention, which can be obtained by reaction of the polymer with at least one activated derivatizing reagent which includes at least one nucleophilic group, or by reaction of the activated polymer with at least one such derivatizing reagent.

Inter alia, in the context of the present invention a derivative of a polymer having at least three functional groups is preferred, as described above, in which at least one receptor group is an amino acid residue or an amino acid derivative residue.

Accordingly, a preferred aspect of the present invention also describes a derivative of a polymer having at least three functional groups, as described above, characterized in that at least one receptor group is an amino acid residue or an amino acid derivative residue.

In order to derivatize the polymer having functional groups with amino acid residues or amino acid derivative residues, the procedure according to the process described above can be used. Thus it is possible first to carry out the reaction of the amino acid with a suitable activating reagent and then to react the reaction product with the polymer. Likewise, it is possible first to activate the polymer with a suitable activating reagent and then to react it with the amino acid. Of course, it is also possible to mix together polymer, amino acid and activating reagent directly.

Depending on the choice of the amino acid, it may be necessary to protect functional groups which are possibly present on the amino acid during the derivatization and/or the activation with protective groups. In this case, possible protective groups are all suitable groups which are known from the prior art. Depending on the later use of the polymer, these protective groups can remain on the amino acid residue after the derivatization or be removed again.

Possible amino acids are, for example:
amino acids having aliphatic residues such as glycine, alanine, valine, leucine, isoleucine;
amino acids having an aliphatic side chain which includes one or more hydroxyl groups, such as serine, threonine;
amino acids which have an aromatic side chain, such as phenylalanine, tyrosine, tryptophan;
amino acids which include basic side chains, such as lysine, arginine, histidine;
amino acids which have acidic side chains, such as aspartic acid, glutamic acid;
amino acids which have amide side chains, such as asparagine, glutamine;
amino acids which have sulphur-containing side chains, such as cysteine, methionine;
modified amino acids, such as hydroxyproline, γ-carboxylglutamate, O-phosphoserine;
derivatives of the amino acids mentioned or, if appropriate, of further amino acids, for example amino acids esterified on the carboxyl group or, if appropriate, the carboxyl groups having, for example, alkyl or aryl radicals which can optionally be suitably substituted.

Here, the amino acids can in principle be bonded to the polymer via any of their functional groups.

Instead of the amino acid, the use of one or more di- or oligopeptides is also possible, where in particular homopeptides, which are only synthesized from identical amino acids, may be mentioned. An example of a dipeptide which may be mentioned is hippuric acid. It is further also possible to use β-, γ- or other structurally isomeric amino acids and peptides derived therefrom such as depsipeptides.

In the process according to the invention, as described above, it is possible to derivatize a polymer having functional groups such that it has different receptor groups.

Accordingly, a preferred aspect of the present invention also describes a derivative of a polymer having at least three functional groups, as described above, which has at least two different receptor groups.

According to what has been said above, a derivative of a polymer having functional groups is therefore also possible which has two or more different amino acid residues or amino acid derivative residues.

In order to optimize the interaction with the substrate, in the context of the present invention the liquid polymer derivative or polymer derivative dissolved or swollen in a solvent or solvent mixture can be deformed in the presence of the substrate, which in this case acts as a template.

Accordingly, a preferred aspect of the present invention also describes a process, such as described above, further comprising the step (iii) the derivative of the polymer having at least one functional group is deformed in the presence of a template compound.

Here, a procedure is used in the deformation, for example, in which a derivatized polymer, as described above, is mixed together with substrate in a suitable solvent or solvent mixture and imparts to the polymer the possibility here of taking on one or more energetically favoured conformations.

A preferred aspect of the present invention likewise describes a derivative of a polymer having at least one functional group, characterized in that it has one or more conformations which is/are adapted to a suitable substrate.

Of course, it is also possible here to mix together a derivatized polymer with different substrates and to deform it. In addition, it is also possible, should this be necessary, to mix together different derivatized polymers with one or more different substrates and to deform them.

Obviously, it is also possible for the derivative of the polymer having at least one functional group to be deformed without a template.

Following the deformation, it is possible in the context of the present information to fix the conformation of the polymer derivative which has been formed by the deformation in the presence of the template.

A preferred aspect of the present invention therefore also describes a process, as described above, characterized in that a conformation resulting from the deformation of the derivative of the polymer having at least one functional group is fixed.

It is possible here to apply the deformed polymer to a support before fixation.

The support material and the form of the support are essentially freely selectable here, where the support material, however, must be constituted such that the polymer can be applied permanently to the support.

If the derivatized polymer applied to the support is used in substance separation processes, a support material is employed which, after the derivatized polymer has been applied, undergoes no or only one or more non-specific interactions with the substances to be separated.

Depending on the later area of use, it may be necessary that the support material is pressure-stable. The term "pressure-stable" in this connection means that the support material is of stable shape at pressures up to 100 bar.

Support materials which can be used are porous and non-porous materials. Inter alia, for example, titanium dioxide, silica gel or cellulose may be mentioned here.

The form of the support material can be adapted here to the requirements of the process and is subject to no restrictions. Pellet-shaped, spherical or strand-like supports, for example, are possible.

In the context of the process according to the invention, the application to the support material is likewise freely selectable. Application by means of impregnation, immersion of the support in an appropriate polymer solution, spraying-on of the polymer or spinning-on of the polymer, for example, are possible.

Obviously, it is also possible to apply the derivatized polymer to different suitable supports. Likewise, it is possible to apply two or more derivatized polymers which are different from one another to one or more suitable supports.

In a further embodiment of the process according to the invention, the derivatized, deformed and fixed polymer is processed per se to give a porous material, such that no additional support is needed. Beads, irregular particles, sponges, discs, strands, membranes, for example, can be obtained here.

In principle, all possible processes can be employed for fixation. In particular, temperature change, solvent exchange, precipitation and crosslinking may be mentioned here. The conformation is preferably fixed by crosslinking.

Accordingly, a preferred aspect of the present invention also describes a process, as described above, which is characterized in that the conformation resulting from the deformation is fixed by crosslinking.

A conformation can be fixed here which has been formed from one type of derivatized polymer. Likewise, however, it is also possible that the conformation was formed from two or more types of derivatized polymers which are different from one another. The term "different types of derivatized polymers" here means that the polymers differ, for example, with respect to the base polymer or the type of activating reagent or the type of receptor groups introduced by derivatization or the degree of activation or the degree of derivatization or a combination of two or more of these features. In particular, polyelectrolyte complexes of polymer strands with cationic and/or anionic receptor groups can be prepared in this way.

The crosslinkage can be achieved here, for example, by reacting two or more strands of derivatized polymer directly with one another. This can be achieved by constituting the groups introduced by derivatization such that covalent and/or non-covalent bonds can be formed between these groups. Very generally, it is possible that these covalent and/or non-covalent bonds are formed between groups which are attached to one polymer strand, and/or are formed between groups which are attached to two or more polymer strands, such that two or more polymer strands can be linked to one another via one or more sites by means of the crosslinkage.

Likewise, it is also possible to employ one or more suitable crosslinking agents for the crosslinkage, with which, as described above, groups within a polymer strand and/or groups which are attached to a number of strands of optionally different derivatized polymers can be crosslinked in a covalent and/or non-covalent manner.

Here, it is especially possible in the context of the present invention to design the derivatizing reagent with respect to its chemical constitution, inter alia, with respect to later crosslinkage, as early as in the derivatization. In particular, the derivatizing reagent can contain groups which are selective for covalent and/or non-covalent crosslinkage.

In principle, possible crosslinking reagents are all suitable compounds known from the prior art. Accordingly, the crosslinkage can take place, for example, in a covalently reversible manner, in a covalently irreversible manner or in a non-covalent manner, where in the case of crosslinkage in a non-covalent manner, for example, crosslinkages via ionic interaction or via charge-transfer interaction may be mentioned. Crosslinking processes or reagents of this type are described, inter alia, in Han, K. K. et al., Int. J. Biochem., 16, 129 (1984), Ji, T. H. et al., Meth. Enzymol., 91, 580 (1983) and Means, G. and Feeney, R. E., Bioconj. Chem., 1, 2 (1990).

Crosslinking reagents which may be mentioned which can lead to covalently irreversible crosslinkage are, inter alia, bi- or polyfunctional compounds such as diols, diamines or dicarboxylic acids. Here, for example, bifunctional crosslinkers are reacted with the activated polymer derivative or the at least bifunctional activated crosslinking reagent is reacted with the non-activated polymer. A covalently reversible crosslinkage can be realised, for example, by linkage of a sulphur-sulphur bond to give a disulphide bridge between two groups attached to one or two polymer strands or by formation of a Schiff's base. Crosslinkage via ionic interaction can taken place, for example, via two radicals, of which one has a quaternary ammonium ion as a structural unit and the other, for example, —COO⁻ or —SO₃⁻ as a structural unit. Crosslinkage via hydrogen bridges can be formed, for example, between two complementary base pairs, for example via the following structure:

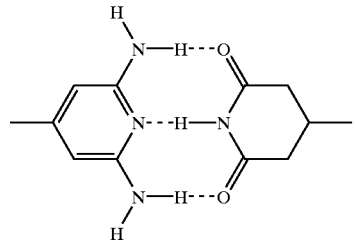

Very generally, polymer derivatives to be crosslinked non-covalently can be of complementary composition with respect to the crosslinking sites, structural units complementary to one another being, for example, acid/triamine or uracil/melamine. Likewise, in the case of a non-covalent crosslinkage, the crosslinking reagent can be complementary to the crosslinking sites on the polymer strand. An example of this which may be mentioned would be, for example, an amine group on the polymer strand and a dicarboxylic acid as the crosslinking reagent.

The degree of crosslinking in the process according to the invention can essentially be chosen arbitrarily and, for example, tailored to the use areas described below. Degrees of crosslinking of up to 5%, however, are preferred. The percentage data relate here to the proportion of the functional groups originally present in the base polymer which are finally crosslinked.

Of course, it is also possible firstly to fix the conformation of the polymer and then to apply the fixed structure to a support.

The fixed polymer derivatives which can be prepared by the process according to the intervention are used, inter alia, in chromatography. The derivatizing reagents and the conditions for fixing the conformation, as described above, are chosen here such that in the chromatogram the possible substrate elutes at a higher k' value than before the polymer deformation, preferably at the highest k' value of all in the mixture of substances present. The k' values of the impurities in these cases remain approximately identical or are modified in the manner that the quotient $\alpha=k_2'/k_1'(k_2'$ relates here to the target substance, $k_1'$ to an impurity) is greater than it was before the deformation. Accordingly, it is possible in continuous chromatography, in particular in SMB chromatography, to reduce a multi-substance separation problem to a two-substance separation problem, since the product, i.e. the possible substrate, goes into the extract, and all by-products together go into the raffinate.

If, as described above, the polymer was derivatized using chiral derivatizing reagents, optionally deformed and crosslinked, it is possible when using the crosslinked polymer to separate racemates in substance separation processes.

In a further preferred embodiment, a preferred aspect of the present invention describes a derivative of a polymer having at least one functional group, which acts as a receptor for the binding of at least one substrate via non-covalent receptor-substrate interaction, where the binding of the at least one substrate can take place via at least two, preferably three, identical or different types of interactions on account of the chemical constitution of the receptor, these multiple interactions in general being synergistically reinforced, e.g. by polyvalent enthalpy gain.

Interactions which may be mentioned are, for example, the interactions already mentioned above. Inter alia, for example, charge-transfer interaction, interaction via hydrogen bonding and ionic interaction may be mentioned.

It is possible here that the different interactions with the at least one substrate can be formed by a single type of receptor groups, but also by two or more different receptor groups.

A preferred aspect of the present invention therefore likewise relates to a process for the binding of at least one substrate to at least one receptor group via non-covalent receptor-substrate interaction, wherein the compound employed having at least one receptor group is a derivative of a polymer having at least one functional group, prepared by a process as described above, or a derivative as defined above.

In addition, a preferred aspect of the present invention also describes a process, as described above, where the process is a chromatography process, in particular an SMB process, a filtration process, a separation process by means of one or more membranes or a catalytic process.

According to a preferred aspect of the invention, the activating reagents employed are compounds of the general structure (I), as described above, where the radicals $R_1$ and $R_2$ are selected such that the reaction with the polymer having at least one functional group can proceed in homogeneous phase.

A preferred aspect of the present invention therefore relates to a compound of the general structure (X)

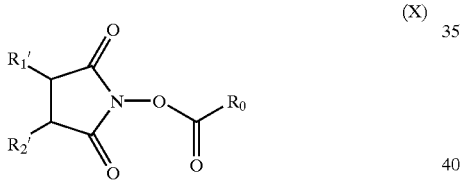

(X)

wherein $R_0$ is a halogen atom or a radical (X')

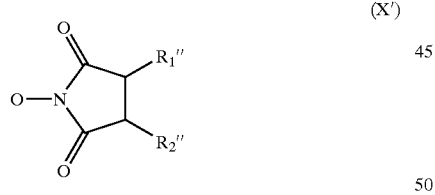

(X')

and $R_1'$, $R_2'$; $R_1''$ and $R_2''$ are identical or different and are hydrogen, straight-chain or branched-chain alkyl, aryl, cycloalkyl, heterocyclic or aralkyl radicals having up to 30 C atoms, or either $R_1'$ and $R_2'$ or $R_1''$ and $R_2''$ or both $R_1'$ and $R_2'$ and $R_1''$ and $R_2''$ are linked to at least one carbocycle or to at least one heterocycle or to at least one carbocycle and to at least one heterocycle, compounds of the following structures $(X_1)$ to $(X_7)$ being excluded:

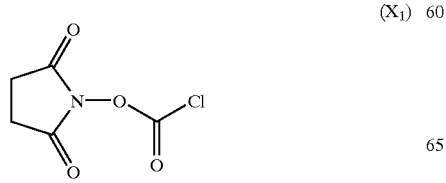

$(X_1)$

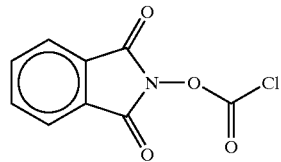

$(X_2)$

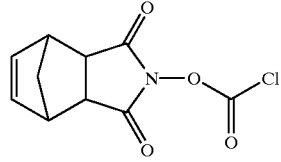

$(X_3)$

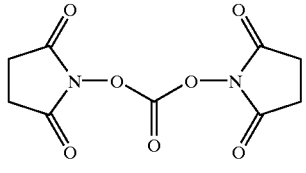

$(X_4)$

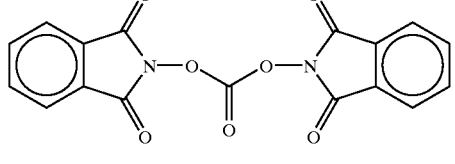

$(X_5)$

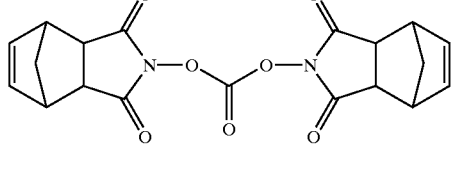

$(X_6)$

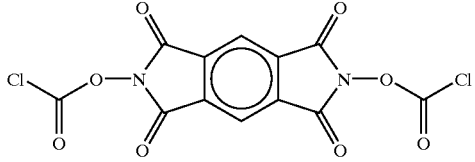

$(X_7)$

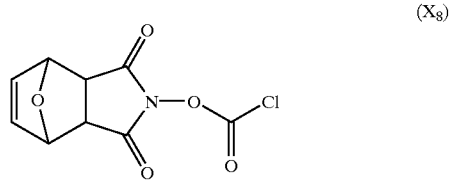

Furthermore, a preferred aspect of the present invention also describes a compound, such as described above, which is characterized in that it is selected from the group consisting of the compounds comprising the following structures $(X_8)$ to $(X_{39})$:

$(X_8)$

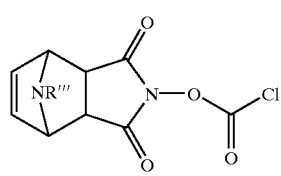

$(X_9)$ ($X_{10}$)
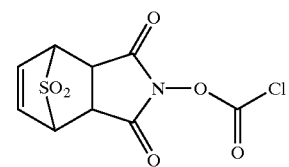
($X_{11}$)
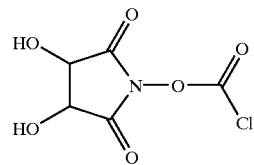
($X_{12}$)
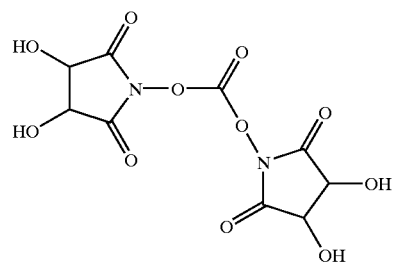
($X_{13}$)
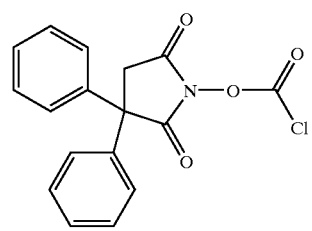
($X_{14}$)
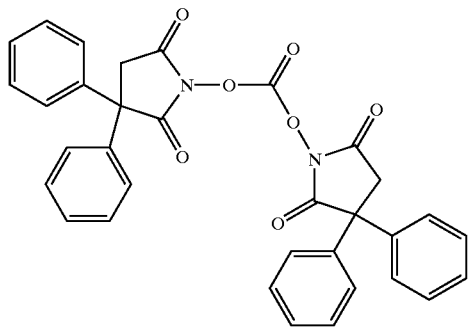
($X_{15}$)
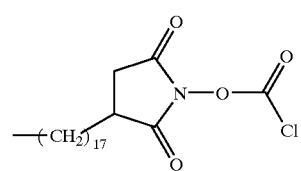
($X_{16}$)
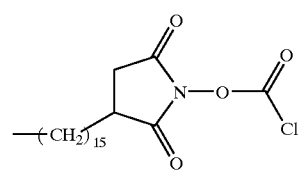
($X_{17}$)
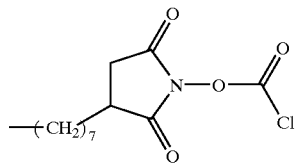
($X_{18}$)
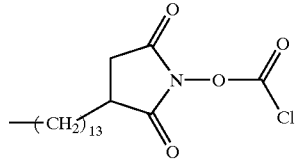
($X_{19}$)
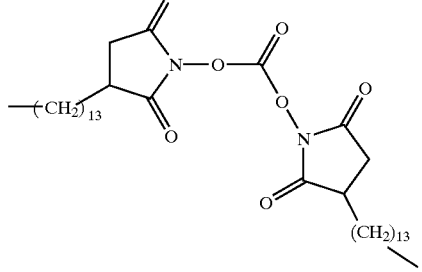
($X_{20}$)
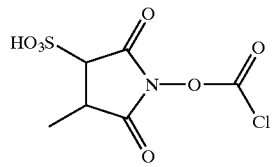
($X_{21}$)
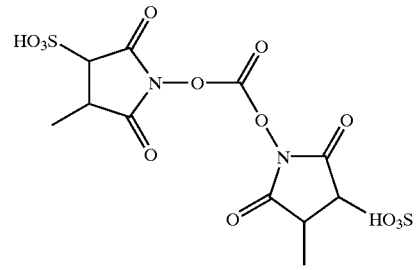
($X_{22}$)
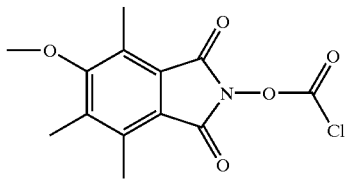
($X_{23}$)
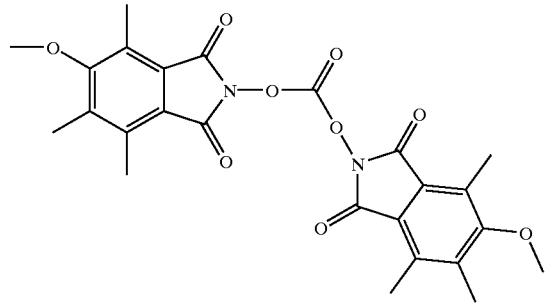

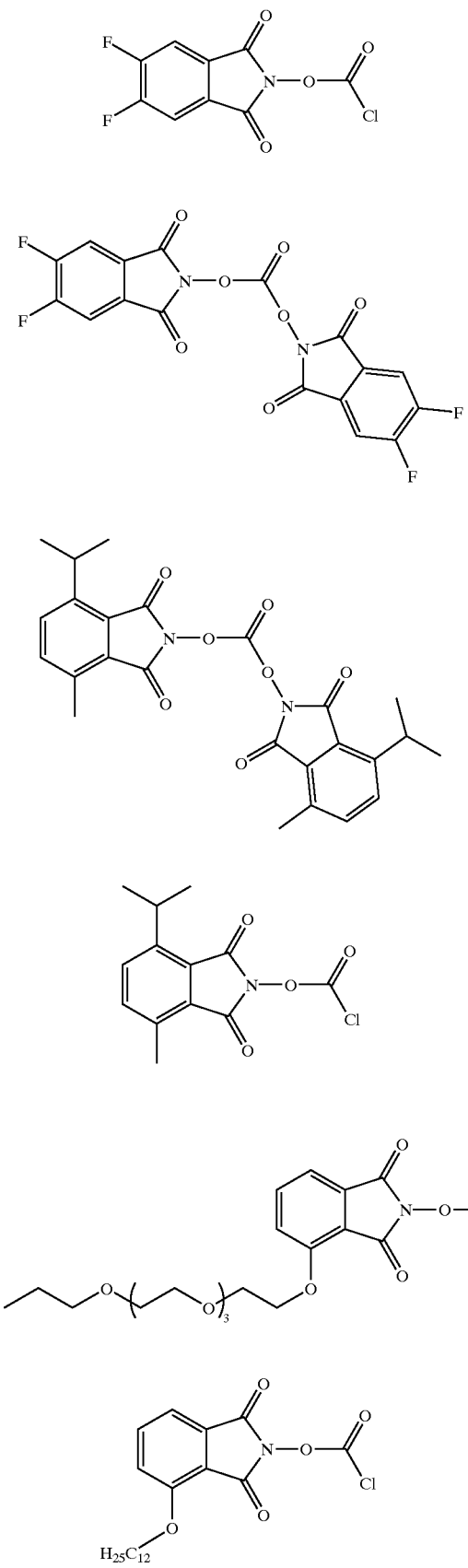
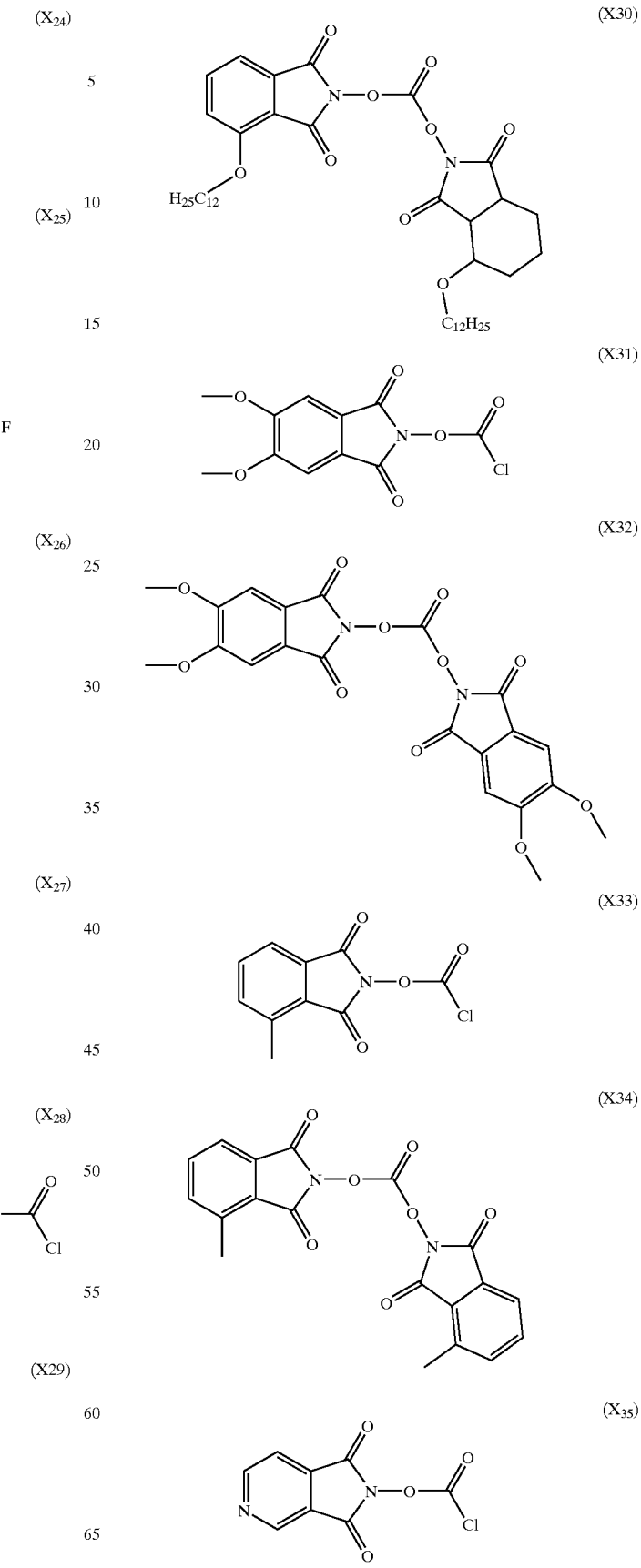

(X36)

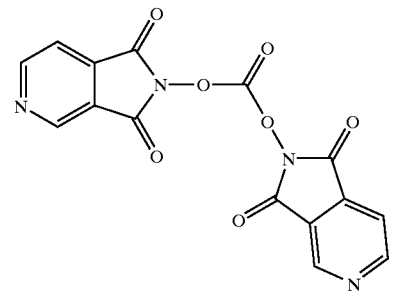

(X37)

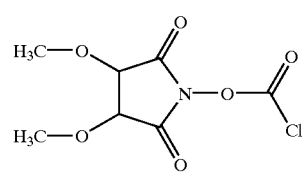

(X38)

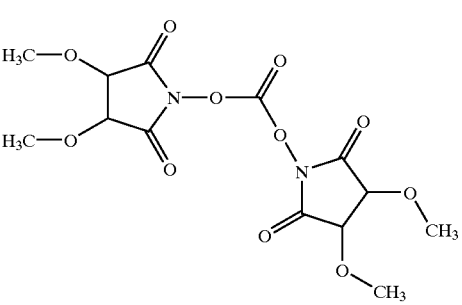

(X39)

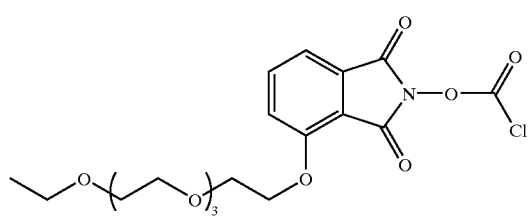

where R''' is hydrogen or a straight-chain or branched-chain, optionally substituted alkyl, aryl or aralkyl having up to 30 C atoms.

In addition to the use as activating reagents for the preparation of derivatives of polymers having functional groups described above, these compounds can also be employed very generally for the activation of functional groups.

A preferred aspect of the present invention therefore also describes the use of a compound of the general structure (X)

(X)

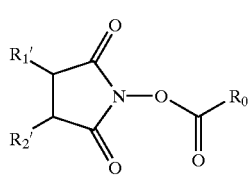

wherein $R_0$ is a halogen atom or a radical of the structure (X')

(X')

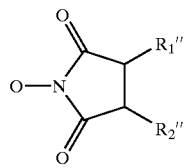

and $R_1'$, $R_2'$, $R_1''$ and $R_2''$ are identical or different and are hydrogen, straight-chain or branched-chain alkyl, aryl, cycloalkyl, heterocyclic or aralkyl radicals having up to 30 C atoms or either $R_1'$ and $R_2'$ or $R_1''$ and $R_2''$ or both $R_1'$ and $R_2'$ and $R_1''$ and $R_2''$ are linked to at least one carbocycle or to at least one heterocycle or to at least one carbocycle and to at least one heterocycle, for the activation of at least one functional group of at least one further compound.

A preferred aspect of the present invention is illustrated in greater detail below with the aid of some examples.

EXAMPLES

Example 1

Preparation of Poly(benzyl N-allylcarbamate) with DS=20 (20% Reaction of the Potential Hydroxyl Groups)

3.36 g (50 mmol) of polyvinyl alcohol (45% hydrolysed, 55% of acetate groups still present) were dissolved in 250 ml of DMSO with stirring in a Erlenmeyer flask. 1.02 g (10 mmol) of triethylamine and 0.61 g (5 mmol) of N,N-4-dimethylaminopyridine were added to this solution. A solution of 3.12 g (10 mmol) of N-(benzylaminocarbonyloxy)-5-norbornene-2,3-dicarboxamide in 50 ml of DMSO was then slowly added dropwise. No precipitate occurred and the reaction mixture was stirred at 20° C. for 60 h.

250 ml of distilled water were then added to the reaction mixture, turbidity of the solution occurring. After addition of 500 ml of 5% strength by weight aqueous sodium hydrogencarbonate solution, small white clusters precipitated. The precipitate was filtered off with suction through a membrane filter after 2 h and washed with 100 ml of 5% strength by weight aqueous sodium hydrogencarbonate solution and 250 ml of distilled water. The residue was predried at 50° C. for 18 h in a vacuum drying oven and then dried for a further 50 h on the high vacuum pump. The yield was 3.6 g which corresponds to a yield of 80%.

Example 2

Preparation of Poly(menthyl N-vinylcarbamate) with DS=40 (40% Reaction of the $NH_2$ groups)

3.44 g (80 mmol) of a polyvinylamine precipitated under neutral conditions (mean molar mass 10000 g/mol) were introduced into a ground Erlenmeyer and dissolved in 200 ml of distilled water. 4.43 ml of triethylamine and 195.4 mg (1.6 mmol) of dimethylaminopyridine (DMAP) were added to the clear polymer solution. The mixture was subsequently stirred at room temperature for 10 min.

11.52 g (32 mmol) of N-(menthyloxycarbonyloxy)-S-norbornene-2,3-dicarboximide (Men-ONB), dissolved in 200 ml of DMSO, were then slowly added dropwise to this solution.

After addition of a few drops, the Men-ONB precipitated again. After complete addition, a thickish suspension was formed, which was subsequently stirred for 2 h. The suspension was then treated with 100 ml of acetone. The suspension clarified to give a slightly turbid solution. This was subsequently stirred at 20° C. for 72 h.

The mixture was transferred to a 2 l round-bottomed flask and the acetone was evaporated. After removal of the acetone, the solution became highly turbid.

The DMSO/water mixture was treated with 150 ml of a 5% strength by weight aqueous sodium hydrogencarbonate solution, a precipitate being formed. The mixture was subsequently stirred for 2 h and then filtered through a fluted filter. The white voluminous precipitate was washed with 300 ml of water and 300 ml of acetone and dried in a vacuum drying oven at 35° C. for 16 h.

3.92 g (42%) of a pale brown solid were obtained.

Example 3

Preparation of Poly(benzyl N-allylcarbamate) with a Degree of Derivatization of 7%

12.56 g (135 mmol) of poly(allylamine hydrochloride) were dissolved in 250 ml of water and the pH was adjusted to 5 using 10% strength aqueous $NaHCO_3$ solution. A solution of 2.96 g (9.45 mmol) of N-(benzyloxycarbonyloxy)-5-norbornene-2,3-dicarboximide in 45 ml of DMSO was added dropwise at 20° C. in the course of 30 mm. The reaction mixture was then stirred at 20° C. for 24 h. The pH was kept at a value of 5 during the reaction time by addition of 10% strength aqueous $NaHCO_3$ solution. 200 ml of 10% strength aqueous $NaHCO_3$ solution were added to the clear reaction mixture. The reaction mixture was then introduced dropwise into 1000 ml of methanol. The derivatized polymer quantitatively precipitated was filtered off through a cellulose nitrate filter (8 μm) and dried in a high vacuum for 24 h. The degree of derivatization of 7% was confirmed by means of $^1$H-NMR spectroscopy.

Example 4

Preparation of Poly(benzyl N-allylcarbamate) with a Degree of Derivatization of 14%

12.56 g (135 mmol) of poly(allylamine hydrochloride) were dissolved in 250 ml of water and the pH was adjusted to 5 using 10% strength aqueous $NaHCO_3$ solution. A solution of 5.92 g (18.9 mmol) of N-(benzyloxycarbonyloxy)-5-norbornene-2,3-dicarboximide in 55 ml of DMSO was added dropwise at 20° C. in the course of 30 min. The reaction mixture was then stirred at 20° C. for 24 h. The pH was kept at a value of 5 during the reaction time by addition of 10% strength aqueous $NaHCO_3$ solution. The reaction mixture was added dropwise In 600 ml of 10% strength aqueous $NaHCO_3$ solution. The derivatized polymer quantitatively precipitated here was filtered off through a cellulose nitrate filter (8 μm) and dried in a high vacuum for 24 h. The degree of derivatization of 14% was confirmed by means of $^1$H-NMR spectroscopy.

Example 5

Preparation of Poly(benzyl N-allylcarbamate) with a Degree of Derivatization of 20%

13.95 g (150 mmol) of poly(allylamine hydrochloride) were dissolved in 200 ml of water and the pH was adjusted to 5 using 10% strength aqueous $NaHCO_3$ solution. A solution of 9.39 g (30 mmol) of N-(benzyloxycarbonyloxy)-5-norbornene-2,3-dicarboximide in 50 ml of DMSO was added dropwise at 20° C. in the course of 30 min. The reaction mixture was then stirred at 20° C. for 24 h. The pH was kept at a value of 5 during the reaction time by addition of 10% strength aqueous $NaHCO_3$ solution. The reaction mixture was added dropwise in 500 ml of 10% strength aqueous $NaHCO_3$ solution. The derivatized polymer quantitatively precipitated here was filtered off through a cellulose nitrate filter (8 μm) subsequently washed with water and dried in a high vacuum for 24 h. The degree of derivatization of 20% was confirmed by means of $^1$H-NMR spectroscopy.

Example 6

Preparation of poly(6-(allylamino)-6-oxohexanoic acid) with a Degree of Derivatization of 7%

5.00 g (54 mmol) of poly(allylamine hydrochloride) were dissolved in 500 ml of water and the pH of the solution was adjusted to the value 5 using 10% strength $NaHCO_3$ solution. A solution of 1.2 g (4 mmol) of 1-adipic acid (N-hydroxy-5-norbornene-2,3-dicarboximide) ester in 100 ml of DMSO was added dropwise at 20° C. in the course of 30 min. The reaction mixture was then stirred at 20° C. for 24 h. 500 ml of 10% strength aqueous $NaHCO_3$ solution and 1000 ml of methanol were added to the clear reaction mixture, the derivatized polymer precipitating. The solvent was decanted off and the polymer was dried in a high vacuum for 24 h.

Example 7

Preparation of poly(2-(2-oxo-1-imidazolidinyl)ethyl N-allylcarbamate) Having a Degree of Derivatization of DS 7%

12.46 g (134 mmol) of poly(allylamine hydrochloride) were dissolved in 250 ml of water and the pH of the solution was adjusted to the value 5 using 10% strength $NaHCO_3$ solution. A solution of 3.14 g (9.4 mmol) of the compound of the following structure

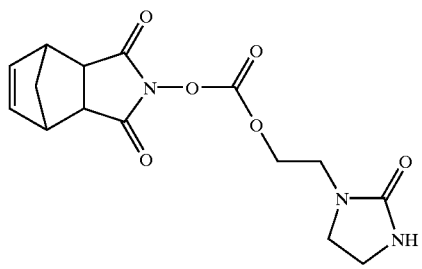

in 50 ml of DMSO was added dropwise at 20° C. in the course of 30 min. The reaction mixture was then stirred at 20° C. for 48 h. The solution was concentrated to 100 ml and the pH was adjusted to 9 by addition of $NaHCO_3$. The derivatized polymer was precipitated by dropwise addition of the reaction solution to 500 ml of methanol, filtered off, washed with methanol and dried in a high vacuum. The degree of derivatization of 7% was confirmed by means of $^1$H-NMR spectroscopy.

Example 8

Preparation of poly(ethylene/co-N-benzyl vinyl carbamate) with a Degree of Derivatization of 8%

5.04 g (165 mmol) of poly(ethylene/co-vinyl alcohol) (ethylene content: 84 mol %) were dissolved in 200 ml of tetrahydrofuran at 50° C. After addition of 1.52 g (15 mmol) of triethylamine and 0.31 g (2.5 mmol) of 4-dimethylaminopyridine, a solution of 4.12 g (13.2 mmol) of the compound of the following structure

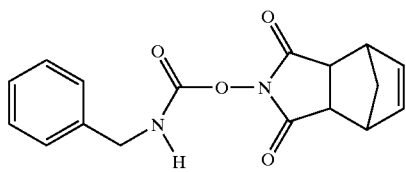

in 50 ml of DMSO was added dropwise in the course of 15 min. The reaction mixture was then stirred at 50° C. for 48 h. The clear solution was introduced into 650 ml of 5% strength aqueous NaHCO$_3$ solution, the polymer precipitating as a slightly yellowish precipitate. After filtration, the precipitate was dried in a high vacuum for 48 h.

Example 9

Preparation of menthhydrazide-ONB

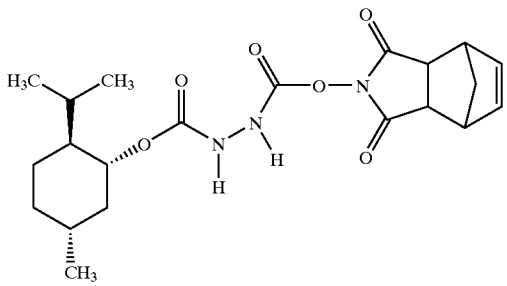

7.71 g (32 mmol) of N-(chlorocarbonyloxy)-5-norbornene-2,3-dicarboximide were dissolved in 350 ml of dichloromethane. A solution of 5.82 g (30 mmol) of menthyl 1-hydrazinecarboxylate and 3.33 g (33 mmol) of triethylamine in 70 ml of dichloromethane was added dropwise at −15° C. in the course of 1 h. The mixture was stirred at −15° C. for a further 15 min and then treated at 0° C. with 150 ml of 10% strength KHSO$_4$ solution. The reaction solution was shaken twice with 150 ml of 10% strength NaHCO$_3$ solution and the organic phase was dried over Na$_2$SO$_4$. After removal of the solvent, pale yellow amorphous crystals remained, which were dried in a high vacuum. Yield: 11.5 g (91.4%).

Example 10

Preparation of poly(ethylene/co-(1-menthyl 2-vinyl 1,2-hydrazinedicarboxylate)) Having a Degree of Derivatization of 28%

0.92 g (25 mmol) of poly(ethylene/co-vinyl alcohol) (ethylene content: 44 mol %) was dissolved in 100 ml of DMSO at 50° C. After addition of 0.71 g (7 mmol) of triethylamine and 0.09 g (0.7 mmol) of 4-dimethylaminopyridine, a solution of 2.93 g (7 mmol) of menthhydrazide-ONB

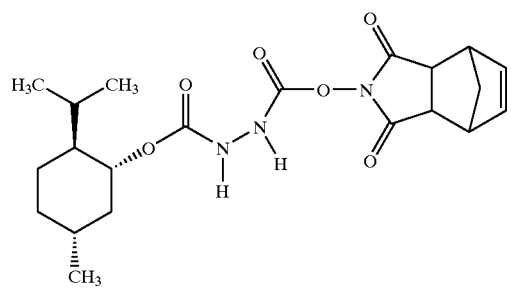

in 25 ml of DMSO was added dropwise in the course of 15 min. The reaction mixture was then stirred at 20° C. for 48 h. The clear solution was treated with 100 ml of water and 200 ml of 5% strength aqueous NaHCO$_3$ solution, the polymer depositing as a white precipitate. After filtration and washing with water, the precipitate was dried in a high vacuum for 48 h.

Example 11

Polymer Deformation

Explanation of the Compounds

Silica gel 300 Å, 20 μm (Daisogel SP 300-15/30), coated with 3 layers of poly(benzyl N-allylcarbamate) having a degree of derivatization of 7%, which are crosslinked to 2% with dodecanedioic acid bis(N-hydroxy-5-norbornene-2,3-dicarboximide) ester=(1), succinic acid bis(N-hydroxy-5-norbornene-2,3-diacarboximide) ester=(2)

A column packed with (1) was conditioned with 0.2% strength (10.5 mmol/l) 5-methyl-5-phenylhydantoin solution (substrate) in CHCl$_3$ and a flow of 0.6 ml/min, about 40 mg of the substrate being absorbed on the column 80 μl of glacial acetic acid were then injected and the outflow was collected in two fractions:

1st fraction: from the injection up to the reattainment of the base line after the substrate peak (6.1 min).

18.2 mg of substrate were contained in this fraction. Of this, the amount of substrate rinsed in from the eluent in this time of 7.32 mg was subtracted, such that a value of 10.9 mg resulted for the amount rinsed out by the glacial acetic acid.

2nd fraction: from the reattainment of the base line after the substrate peak up to the fresh establishment of the equilibrium present before the injection (6.1 to 80 min), 72.2 mg of substrate were found in this fraction. As 88.7 mg had been rinsed in by the eluent in this time (73.9 min), the amount of substrate taken up by the stationary phase was 16.5 mg.

After completion of the injection, the column was dismantled and cooled to 0° C. (about 30 min).

For the preparation of a crosslinker solution, (2) (186.2 mg, 0.423 mmol) was dissolved in 19.24 ml of 0.2% strength (10.5 mmol/l) of 5-methyl-5-phenylhydantoin solution and triethylamine (0.76 ml) was added. This solution was rinsed into the system (without column) from a storage vessel cooled to 0° C.

After the base line had become constant, the column was again incorporated into the system such that in this case it furthermore remained cooled to 0° C. The crosslinker solution was rinsed into the column at 5 ml/min. After the breakthrough of the crosslinker front (UV 265 nm), the flow was stopped.

The column was again dismantled, furthermore cooled to 0° C. for 30 min and then laid in a column thermostat (120 min, 25° C.).

The system (without column) was rinsed with tetrahydrofuran, and the column was incorporated into the system again after a reaction time of 120 min and rinsed with 50 ml of tetrahydrofuran (1 ml/min).

For the deactivation of the still remaining free (N-oxy-5-norbornene-2,3-dicarboximide) groups of the crosslinker, diethylamine (40.2 mg, 0.55 mmol) (5 equivalents based on maximum N-hydroxy-5-norbornene-2,3-dicarboximide formed) was dissolved in tetrahydrofuran (20 ml) (quench solution), rinsed into the column (1 ml/min), and the solution from the column outlet was again rinsed into the column for 5 h and then switched to tetrahydrofuran. After the base line had become constant, the pump was stopped, the column thermostat was adjusted to 50° C. and this temperature was maintained for 30 min. The tetrahydrofuran was then again pumped at 1 ml/min until pure tetrahydrofuran was eluted.

What is claimed is:

1. A process comprising:
    (i) reacting a polymer, having a functional group, with an activating reagent such that the activating reagent reacts with the functional group, to yield a first reaction product having an activated functional group; and
    (ii) reacting the first reaction product with a derivatizing reagent such that the derivatizing reagent reacts with the activated functional group, to yield as a second reaction product a derivatized polymer;
    the activating reagent being a derivative of a compound of the structure

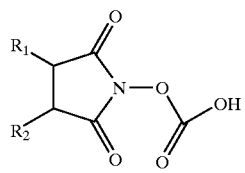

wherein $R_1$ and $R_2$ are straight-chain, branched-chain or bridged as a carbocycle or a heterocycle; and
    the functional group is selected from OH, $NHR_{11}$, SH, $OSO_3H$, $SO_3H$, $OPO_3H_2$, $OPO_3HR_{11}$, $PO_3H_2$, $PO_3HR_{11}$ and COOH, with $R_1$, $R_2$ and $R_{11}$ selected such that the process can be carried out in homogeneous phase.

2. The process of claim 1 wherein the derivatizing reagent has the general composition $HY\text{—}R_{12}$, with Y selected from O, NH, $NR_{13}$ and S, and $R_{12}$ and $R_{13}$ are freely selected.

3. The process of claim 1 wherein the polymer has two such functional groups separated by a non-substrate-specific functional group and/or by a monomer unit without a functional group, step (i) yields the first reaction product with two activated functional groups, and step (ii) yields the second reaction product with two derivatized groups separated by said non-substrate-specific functional group and/or by said monomer unit, the derivatized groups being able to interact with a suitable substrate as receptor groups.

4. The process of 1 further comprising:
    (iii) binding a substrate to the derivatized group of the second reaction product via a non-covalent interaction.

5. The process of 4 wherein the binding takes place via at least two different types of said non-covalent interaction.

6. A polymer prepared by the process of any one of claims 1–5.

7. A process comprising:
    (i) reacting a polymer, having a functional group, with a derivative of an activating reagent such that the derivative of the activating reagent reacts with the functional group, to yield as a reaction product a derivatized polymer;
    the activating reagent being a derivative of a compound of the structure

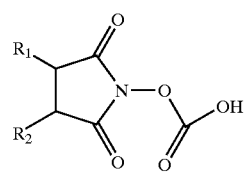

wherein $R_1$ and $R_2$ are straight-chain, branched-chain, or bridged as a carbocycle or a heterocycle; and
    the functional group is selected from OH, $NHR_{11}$, SH, $OSO_3H$, $SO_3H$, $OPO_3H_2$, $OPO_3HR_{11}$, $PO_3H_2$, $PO_3HR_{11}$ and COOH, wherein $R_1$, $R_2$ and $R_{11}$ are selected such that the process can be carried out in homogeneous phase.

8. The process of claim 7 wherein the derivative of the activating reagent is obtained by prior reaction of the activating reagent with a derivatizing reagent.

9. The process of claim 8 wherein the derivatizing reagent has the general composition $HY\text{—}R_{12}$, with Y selected from O, NH, $NR_{13}$ and S, and $R_{12}$ and $R_{13}$ can be freely selected.

10. The process of claim 7 wherein the polymer has two such functional groups separated from each other by a non-substrate-specific functional group and/or by a monomer unit without a functional group, and step (i) yields the reaction product with two derivatized groups separated by said non-substrate-specific functional group and/or by said monomer unit, the derivatized groups being able to interact with a suitable substrate as receptor groups.

11. The process of 7 further comprising:
    (ii) binding a substrate to the derivatized group of the reaction product via a non-covalent interaction.

12. The process of 11 wherein the binding takes place via at least two different types of said non-covalent interaction.

13. A polymer prepared by the process of any one of claims 7–12.

* * * * *